(12) United States Patent
Thueringer et al.

(10) Patent No.: US 10,044,512 B2
(45) Date of Patent: Aug. 7, 2018

(54) DECOUPLING OF MEASURING THE RESPONSE TIME OF A TRANSPONDER AND ITS AUTHENTICATION

(75) Inventors: Peter Thueringer, Graz (AT); Hans De Jong, Eindhoven (NL); Bruce Murray, Hamburg (DE); Heike Neumann, Hamburg (DE); Paul Hubmer, Hart-Purgstall (AT); Susanne Stern, Thal (AT)

(73) Assignee: NXP B.V., Eindhoven (NL)

( * ) Notice: Subject to any disclaimer, the term of this patent is extended or adjusted under 35 U.S.C. 154(b) by 1004 days.

(21) Appl. No.: 12/994,541

(22) PCT Filed: Nov. 3, 2008

(86) PCT No.: PCT/IB2008/054566
§ 371 (c)(1),
(2), (4) Date: Nov. 24, 2010

(87) PCT Pub. No.: WO2009/144534
PCT Pub. Date: Dec. 3, 2009

(65) Prior Publication Data
US 2011/0078549 A1 Mar. 31, 2011

(30) Foreign Application Priority Data
May 26, 2008 (EP) .................................... 08104094

(51) Int. Cl.
| H04K 1/00 | (2006.01) |
| H04L 9/32 | (2006.01) |
| H04L 9/00 | (2006.01) |

(52) U.S. Cl.
CPC ............ *H04L 9/3271* (2013.01); *H04L 9/002* (2013.01); *H04L 9/3242* (2013.01); *H04L 2209/805* (2013.01)

(58) Field of Classification Search
CPC .............................. G06F 21/72; G06F 22/7219
(Continued)

(56) References Cited

U.S. PATENT DOCUMENTS 5,189,700 A * 2/1993 Blandford ..................... 713/178
7,583,691 B2 9/2009 Martin
(Continued)

FOREIGN PATENT DOCUMENTS

| EP | 1 650 671 A1 | 4/2006 |
| EP | 1 737 179 A1 | 12/2006 |
(Continued)

OTHER PUBLICATIONS

Clulow et al. "So Near and Yet So Far: Distance-Bounding Attacks in Wireless Networks" Pub. 2006, pp. 83-97.*
(Continued)

*Primary Examiner* — Oscar Louie
*Assistant Examiner* — James Forman

(57) ABSTRACT

Reader (420) for determining the validity of a connection to a transponder (440), designed to measure a response time of a transponder (440) and to authenticate the transponder (440) in two separate steps. Transponder (440) for determining the validity of a connection to a reader (420), wherein the transponder (440) is designed to provide information for response time measurement to said reader (420) and to provide information for authentication to said reader (420) in two separate steps, wherein at least a part of data used for the authentication is included in a communication message transmitted between the reader (420) and the transponder (440) during the measuring of the response time.

14 Claims, 5 Drawing Sheets

(58) Field of Classification Search
USPC .......................................................... 380/258
See application file for complete search history.

(56) References Cited

U.S. PATENT DOCUMENTS

| | | | |
|---|---|---|---|
| 7,590,880 B1* | 9/2009 | Hershman | ..................... 713/502 |
| 2005/0060595 A1* | 3/2005 | Kurts | ..................... G06F 21/71 |
| | | | 713/600 |
| 2005/0193193 A1* | 9/2005 | Skovira | ..................... 713/160 |
| 2006/0087407 A1 | 4/2006 | Stewart et al. | |
| 2007/0116266 A1 | 5/2007 | Greco et al. | |
| 2007/0239897 A1* | 10/2007 | Rothman | ................ H04L 69/04 |
| | | | 709/247 |
| 2009/0045911 A1* | 2/2009 | Bauchot et al. | ............... 340/5.8 |
| 2009/0089583 A1* | 4/2009 | Patel | ............................. 713/171 |

FOREIGN PATENT DOCUMENTS

| | | |
|---|---|---|
| JP | 2006-197458 A | 7/2006 |
| JP | 2007-257166 A | 10/2007 |

OTHER PUBLICATIONS

Meadows et al. "Distance Bounding Protocols: Authentication Logic Analysis and Collusion Attacks", Pub. 2007, pp. 279-298.*
Singelee et al. "Distance Bounding in Noisy Environments" Pub. 2007, p. 101-115.*
Bussard et al. "Embedding Distance-Bounding Protocols within Untuitive Interactions". Pub. 2004, pp. 143-156.*
Brands, S. et al. "Distance-Bounding Protocols", Lecture Notes in Computer Science, vol. 765, pp. 344-359 (1993).
Tu, Y.-J. et al. "RFID Distance Bounding Protocols", The First International EURASIP Workshop on RFID Technology, 2 pgs, retrieved from the Internet at: http://www.eurasip.org/Proceedings/Ext/RFID2007/papers.html (2007).
Hancke, G.P., et al; "An RFID Distance Bounding Protocol"; First Intl Conference on Security and Privacty for Emerging Areas in Communications Networks 2005; Securecom 2005; p. 67-73; (2005).
Menezes, et al; "Handbook of Applied Cryptography"; CRC Press, Boca Raton FL, US; pp. 400-405.
Identification Cards—Contactless Integrated Circuits(S) Cards—Proximity Cards; Intl Standard ISO/IEC No. 14443-4; pp. 1-34 (Feb. 1, 2001).
International Search Report for Application PCT/IB2008/054566 (dated Jul. 30, 2009).

* cited by examiner

DECOUPLING OF MEASURING THE RESPONSE TIME OF A TRANSPONDER AND ITS AUTHENTICATION

FIELD OF THE INVENTION

The invention relates to a reader for determining the validity of a connection to a transponder, designed to measure a response time of a transponder and to authenticate the transponder. Furthermore the invention relates to a transponder for determining the validity of a connection to a reader, designed to provide information for response time measurement to said reader and to provide information for authentication to said reader. Moreover, the invention relates to a method for a reader of determining the validity of a connection to a transponder and to a method for a transponder of determining the validity of a connection to a reader. Beyond this, the invention relates to a program element. Furthermore, the invention relates to a computer-readable medium.

BACKGROUND OF THE INVENTION

The so-called "relay attack problem" occurs when transponders (in particular smart cards and RFID tags) are used. Transponders are usually read by a reader which is very close to the transponder (near field communication). With the relay attack this local binding is released for criminal acts.

In an example, person A is in a bar and has parked his car in front of the bar. The car is equipped with a key less entry feature (that is to say car access by means of a transponder, in particular a smart card). Person B reads the data from the transponder, which A has in his pocket, and sends the data via a mobile phone to person C who stands next to the car. In this way C can open the car without giving A a chance to be aware of the theft.

When a transponder is read by a reader the measurement of the response time can be measured to detect such a relay attack, as the transmission via e.g. GSM takes longer than the near field communication. If the response time is out of a predetermined time window, access can be denied. Because of faster and faster transmission means, one will try to make this time window as small as possible.

However, there is the time needed for encryption/decryption during authentication. Because the algorithms for authentication become more complex, there is a physical limit for the time window.

Hancke, G. P., Kuhn, M. G., "An RFID Distance Bounding Protocol", First International Conference on Security and Privacy for Emerging Areas in Communications Networks 2005, SecureComm 2005, pp. 67-73, discloses that radio-frequency identification tokens, such as contactless smartcards, are vulnerable to relay attacks if they are used for proximity authentication. Attackers can circumvent the limited range of the radio channel using transponders that forward exchanged signals over larger distances. Cryptographic distance-bounding protocols that measure accurately the round-trip delay of the radio signal provide a possible countermeasure. They infer an upper bound for the distance between the reader and the token from the fact that no information can propagate faster than at the speed of light. A distance-bounding protocol based on ultra-wideband pulse communication is disclosed. Aimed at being implementable using only simple, asynchronous, low-power hardware in the token, it is particularly well suited for use in passive low-cost tokens, noisy environments and high-speed applications.

OBJECT AND SUMMARY OF THE INVENTION

Hence, it is an object of the invention to provide a reader and/or a transponder being operable in a safe manner.

The object of the invention is achieved by a transponder, a reader, methods, a program element and a computer-readable medium according to the independent claims.

According to an exemplary embodiment, a reader (which may be communicatively coupled with a transponder) for determining the validity of a connection to a transponder (particularly an authorized transponder which may be communicatively coupled with the reader) is provided, wherein measurement of a response time of a transponder (particularly in response to a corresponding request of the reader, wherein the response time may be a time interval between transmission of the request from the reader to the transponder and the receipt of a response to the request from the transponder) and authentication of the transponder (particularly by an encrypted communication message transmitted from the transponder to the reader after having previously transmitted another non-encrypted communication message for the purpose of response time measurement) is done in two separate steps (particularly is done by two separate communication messages which are transmitted with a time interval in between). At least a part of data used (particularly later) for the authentication may be included in a communication message transmitted (particularly before the authentication) between the reader and the transponder during the measuring of the response time.

According to another exemplary embodiment, a transponder for determining the validity of a connection to a reader is provided, wherein information for response time measurement and information for authentication is provided to said reader in two separate steps. At least a part of data used (particularly later) for the authentication may be included in a communication message transmitted (particularly before the authentication) between the reader and the transponder during the measuring of the response time.

According to still another exemplary embodiment, a method for a reader (or performed by a reader) of determining the validity of a connection (of the reader) to a transponder is provided, the method comprising:

sending, by the reader, a first command (such as a first communication message) together with a second random number to said transponder (step 1), receiving, by the reader, a first random number (particularly in plaintext) from said transponder (step 2), receiving, by the reader, an encryption of the first random number and of the second random number (particularly in an encrypted form) from the transponder (step 3), decrypting, by the reader, the received number (particularly the encyrpted first and second random numbers) with the same key, which was used by the transponder, or decrypting the first random number and the second random number with said key (step 4), checking, by the reader, whether the first random number and the second random number of step 2 and the first random number and the second random number of step 3 coincide (step 5), checking, by the reader, whether the first random number was received within a predetermined time window (step 6), and qualifying, by the reader, the connection to the transponder as valid if (particularly both) the result of the check in step 5 and the result of the check in step 6 is true (step 7).

According to yet another exemplary embodiment, a method for a transponder of determining the validity of a connection to a reader is provided, the method comprising:

receiving, by the transponder, a first command together with a second random number from said reader, sending, by the transponder, a first random number to said reader, sending, by the transponder, an encryption of the first random number and the second random number to said reader.

According to yet another exemplary embodiment (a detailed explanation being provided in FIG. 5 and corresponding description), a method for a reader of determining the validity of a connection to a transponder is provided, the method comprising:

sending a first command together with a second random number to said transponder, receiving a first random number from said transponder, sending a first Message Authentication Code (MAC) generated based on the first random number and the second random number to the transponder, receiving a second Message Authentication Code (MAC) which may be generated based on the first random number and the second random number from the transponder, checking whether the second Message Authentication Code (MAC) is valid, checking whether the first random number was received within a predetermined time window, and qualifying the connection to the transponder as valid if the result of both checks is true.

According to yet another exemplary embodiment (a detailed explanation being provided in FIG. 5 and corresponding description), a method for a transponder of determining the validity of a connection to a reader is provided, the method comprising:

receiving a first command together with a second random number from said reader, sending a first random number to said reader (particularly immediately in response to the received first command), receiving a first Message Authentication Code (MAC) generated based on the first random number and the second random number from the reader, checking whether the first Message Authentication Code (MAC) is valid, sending a second Message Authentication Code (MAC) generated based on the first random number and the second random number to the reader when the first Message Authentication Code (MAC) is valid (when the first Message Authentication Code (MAC) is not valid, the transponder may send another Message Authentication Code (MAC) to the reader which is not generated based on the first random number and the second random number, for instance may be generated to indicate that authentication fails).

According to still another exemplary embodiment of the invention, a program element (for instance a software routine, in source code or in executable code, for instance a downloadable program) is provided, which, when being executed by a processor, is adapted to control or carry out one of the methods having the above mentioned features.

According to another exemplary embodiment of the invention, a computer-readable medium (for instance a CD, a DVD, a USB stick, a floppy disk or a harddisk) is provided, in which a computer program is stored which, when being executed by a processor, is adapted to control or carry out one of the methods having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "transponder" may particularly denote an RFID tag or a (for instance contactless) smartcard. More generally, a transponder may be a device (for instance comprising a chip) which may automatically transmit certain (for example coded) data when activated by a special signal from an interrogator.

The term "reader" may particularly denote a base station adapted for sending an electromagnetic radiation beam for reading out a transponder and detecting a back reflected or emitted signal. The reader device may be adapted as one of the group consisting of a read and/or write device, an RFID reader, a contactless chip card reader, a passive transponder, and a Near Field Communication device. However, communication can also take place over a wired interface.

One or more "applications" may be provided by a communication system formed by the transponder and the reader. Such an application may particularly denote a service within the communication system formed by the reader and the transponder to which service the transponder and/or the reader may provide a contribution. The provision of such a contribution may involve the capability of the transponder to provide stored or calculated data, to provide processing capabilites, etc. Examples for such services is the payment of a fare for using a public transportation by a user of the transponder, the payment of a purchase price for a good by a wireless payment system, etc.

The term "Message Authentication Code" (MAC) may particularly denote a short piece of information used to authenticate a message. A MAC algorithm may accept as input a secret key and an arbitrary-length message to be authenticated, and may output a MAC. The MAC value may protect both a message's data integrity as well as its authenticity, by allowing verifiers (who also possess the secret key) to detect any changes to the message content.

An embodiment of the invention offers the advantage that the qualification whether a connection between a reader and a transponder as valid (that is a determination whether the connection is corrupted or not) may be performed with high certainty by timely separating a communication for response time measurement and a communication for security purposes. In other words that means that an attack, in particular a relay attack, is detectable with high probability. This may be achieved by decoupling the time needed for a cryptographic operation from the measuring of the response time of a transponder. Moreover, a communication between reader and transponder during the time measurement section may be used synergetically to transmit codes which are later used for authentication. This may allow for a very efficient usage of bandwidth and for a fast initialisation phase. Moreover, by exchanging such codes, the parallel generation of such codes in both entities may be prevented thereby reducing computational burden of the system, since it may be sufficient that such codes are generated only in one of the two entities. For instance, a first command from the transponder to the reader requesting the reader to respond immediately for response time measurement may carry a random number as a part of the code used for a subsequent encrypted authentication.

Embodiments of the invention may have the following further advantages:

For instance, such a system is applicable to mass transit, but also to keyless entry systems in cars and many other applications.

A corresponding communication system is for instance applicable to DRM protected content which is only to be consumed at a certain location.

A corresponding communication system is for instance applicable to prisoners on parole who need to stay at home.

Hence, embodiments of the invention provide a proper solution for determining the validity of a connection between a reader and a transponder.

In the following, further exemplary embodiments of the reader will be explained. However, these embodiments also apply to the transponder, to the methods, to the program element and to the computer-readable medium.

According to an exemplary embodiment, the reader may be designed to measure the response time as a time interval between sending a first command from said reader to said transponder and receiving a first random number from said transponder in response to the first command. In other words, the response time may be indicative for a time required by the transponder to send an answer to a query of the reader. When the reader measures such a time interval, it is possible to evaluate the time required for the transponder for sending the first random number. In case of a relay attack problem (which involves an additional transmission path due to the attack), this time will be longer than a predetermined threshold value. When the transponder does not encrypt the first random number before sending it to the reader in the context of response time measurement (so that no delay due to encrypting is to be expected), any additional delay in addition to the propagation of messages between reader and transponder will very probably result from a relay attack. The absence of such an additional delay may allow the reader to reason that the communication with the transponder is valid. Particularly in a scenario in which the first random number is received by the reader (in response to the first request) in plaintext or in an unencrypted manner, the response time of the transponder is a proper measure for determining whether there is a relay attack problem or not. For example, if the measured response time is smaller than a predetermined threshold value, the connection between transponder and reader may be classified as valid.

Still referring to the previously described embodiment, the reader may be designed to authenticate the transponder based on an evaluation whether an encryption of the first random number (that is the first random number transmitted from the transponder to the reader in an encrypted way in response to a second request) received from the transponder after having received the first random number for measuring the response time, coincides with the first random number received for measuring the response time. In other words, the first random number transmitted in response to the first command may be compared with the first random number (after decryption, which encrypted first random number can be sent from the transponder to the reader) transmitted in response to a second command. Thus, a response time measurement may be decoupled from an authentication verification, since one and the same random number is first sent without encryption for response time measurement purpose only, and is subsequently retransmitted in an encrypted manner for authentication purposes.

In a preferred embodiment, the reader may be designed to measure the response time as a time interval between sending a first command together with a second random number to said transponder and receiving a first random number from said transponder in response to the first command. In other words, together with sending the first request, the reader may simultaneously transmit to the transponder a second random number which can be subsequently used for at least one of the following two purposes. One purpose is that the received second random number can be used by the transponder for deriving a third random number which, in a future session, can be used by the transponder. A second purpose is that this second random number which has been transmitted from the reader to the transponder can also be used (in addition to the first random number) for authentication purposes, as will be explained in the following.

Namely, the reader device may be designed to authenticate the transponder based on an evaluation whether an encryption of the second random number and the first random number received from the transponder after having received the first random number for measuring the response time, coincides with the first random number received for measuring the response time and with the second random number. In this scenario, the reader may transmit the second random number to the transponder in the context of the response time measurement. In a later procedure, the transmitter may then encrypt an authentication message with both the first random number already stored in the transponder and the second random number received from the reader. These two random numbers may together be encrypted with a specific key (which may also be known to the reader). This may allow to safely identify the transponder and simultaneously be sure that only an authorized transponder communicates with the reader, thereby eliminating the relay attack problem with high degree of safety.

The reader may be designed to qualify the connection to the transponder as valid only upon determining that the response time interval is within a predetermined time window (for instance is smaller than a predefined threshold time) AND that there is simultaneously a coincidence between the first random number (and optionally additionally the second random number) transmitted in an encoded form from transponder to reader. Thus, a logic AND combination between the two criteria may be necessary to accept the connection between transponder and reader as valid. A first criteria is that the time interval of the transponder for responding to the first command is shorter than a predetermined threshold value. This can ensure that an relay attack problem can be ruled out. Since the transmission of the first response is performed without any processing load or task performed by the transponder, the actual transmission time is a proper measure for the length of the transmission path between transponder and reader and is significantly changed in case of a relay attack problem. The second criteria ensures that the same transponder which has responded to the first command also provides an encrypted password which may be formed by a combination of the first random number (stored in the transponder) and the second random number (transmitted by the reader together with the first command).

The reader may be designed to exchange data for authentication and/or to exchange data for a proximity check with the transponder split into a plurality of communication messages. Hence, not all authentication information or not all proximity check (for instance by response time measurement) information needs to be included in a single message exchanged between reader and transponder. In contrast to this, corresponding codes may be divided into different sections which may be sent by different communication messages sent from reader to transponder, or vice versa. For instance, a proximity check may be divided in multiple pieces to obtain refined time information.

The reader may be designed to send the first command (which may include the second random number) free of a Cyclic Redundancy Check (CRC). This concept is a fundamentally different approach as compared to ISO 14444-4 systems relying on an CRC attached at an end of a data section communicated from a reader to a tag. Embodiments of the invention may attach a CRC to a response message sent from the tag to the reader, for error correction purposes. This CRC, for the purpose of the reader to determine that no distortion of the communication took place, may include the first command (including the second random number) and the response (including the first random number).

Next, further exemplary embodiments of the transponder will be explained. However, these embodiments also apply to the reader, to the methods, to the program element and to the computer-readable medium.

The transponder may be designed to send a first random number to the reader for response time measurement in response to a first command received from the transponder. This first random number may be sent from the transponder to the reader in an unencrypted (or plaintext) form. By taking this measure, it becomes possible that a measurement of the time interval between sending the command by the reader and receiving the response from the transponder is not delayed artificially by an encryption procedure to be performed by the transponder, since the performance of such an encryption procedure would artificially increase the response time and would make it impossible to distinguish between a regular response of an authorized transponder communicating with the reader and the presence of a relay attack problem. Thus, sending the first random number in an unencrypted manner may increase the reliability of the decision regarding validity.

Particularly, the transponder may be designed to send a first random number undelayed to the reader for response time measurement. Thus, the transponder may be configured in such a manner that the transmission of the first random number in response to the first command occurs as soon as possible without adding any delay for additional processing or the like. This may allow to increase the probability that the absence of a relay attack problem is detectable in a reliable manner.

The transponder may be designed to send the first random number in response to the first command which first command includes a second random number. Thus, the first command may include the second number which can be used as a trigger for the transponder to send back a response comprising the first random number. For instance, after having sent the first random number to the reader, the transponder may generate and store a third random number based on the second random number to substitute the first random number in a future session(a session takes as long until the card leaves the radio range of the reader again). For example, it is possible that the second random number is stored in the transponder, and that a certain algorithm is applied to the second random number to calculate the third random number. All this can be done after having sent the first random number back to the reader, that is to say in an interval in which the transponder has free processing capacity. This procedure may allow to update the first random number for another session for communicating between the transponder and the reader device, to thereby further increase the safety due to a change of the random number exchanged between transponder and reader for response time measurement and authentication.

The transponder may be designed to send an encryption of the first random number after receipt of a second command from said transponder sent after sending the first command. Hence, the second command may be sent by the reader after the reader has received the first random number in an unencrypted manner from the transponder.

However, when an encryption of the first random number in combination with the second random number is performed by the transponder, this guarantees the reader that the transponder does not only reply in a sufficiently fast manner to exclude the relay attack problem, but that the presently communicating transponder is also authorized for such a communication, since this requires the knowledge of both the first and the second random number as well as an encryption key.

For authentication upon receipt of the encrypted communication message including both the first and the second random numbers, the reader has two opportunities. A first opportunity is to decrypt the encrypted communication message including the first and the second random number obtained from the transponder and to compare the decrypted first and the second random numbers in plaintext with the first and the second random numbers stored in a memory of the reader. Namely, the reader has received in the first reply from the transponder the first random number. Furthermore, since the reader has sent the second random number to the transponder with the first command, the reader already knows the second number. A second opportunity is that the reader encrypts the known first and the second random numbers with a known key which is also used by the transponder. Then, the so encrypted communication message generated by the reader can be compared with the second response obtained from the transponder.

The transponder may be designed to analyze communication messages exchanged with the reader to thereby determine whether the transponder is in proximity of the reader and to terminate communication with the transponder upon determining that the transponder is not in proximity of the reader. Hence, not only the reader may analyze sufficient proximity between reader and transponder (for instance that the distance between reader and transponder is smaller than a threshold value or the response time is smaller than a threshold value), but also the reader may perform a check whether a predefined criteria regarding sufficient proximity is fulfilled. A verify proximity check (VPC) message and response may allow both to determine the proximity (the reader doing time measurement and checking what the transponder received and sent, the transponder checking what it received and what the reader received).

The transponder may be designed to exchange data for authentication and/or to exchange data for a proximity check with the reader split into a plurality of communication messages. Thus, not all authentication information or not all proximity check (for instance by response time measurement) information needs to be included in a single message exchanged between reader and transponder. In contrast to this, corresponding codes may be divided into different sections which may be sent by different communication messages sent from reader to transponder, or vice versa. For instance, a proximity check may be divided in multiple pieces to obtain refined time information.

The transponder may be designed to send the first random number to the reader together with a Cyclic Redundancy Check (CRC). Error recovery may be performed by applying a CRC on the response which also includes the command. The CRC may be computed over the RAC1 command, Random #1 and Random#2.

The transponder may be designed to send the encryption together with information indicative of a timing, particularly indicative of a speed, of a communication between the transponder and the reader. Such information may be indicative of the speed of operation between the communication partners. A corresponding data section may be included in the communication messages exchanged between reader and transponder and may be denoted as a PPSE data field. The reader may use this to stop the communication with the transponder.

The transponder may be designed to detect and limit a frequency at which in operates to stop communicating with the reader once the frequency is out of bound. This may be performed for the purpose of not increasing the residual relay attack window.

The response to the transponder command may comprise only a number of bytes out of RndR, optionally including CRC. The transponder command does not have a CRC. In another embodiment, this may be changed so that the partial RndR sent from the transponder may be followed by a CRC over the transponder command (including the random number) as it was received extended with the partial RndR. The former reader has no possibility to detect communication errors and recover from them so that a proximity check may fail after a communication error and the transponder has to be taken out of the field or deselected. The CRC over the transponder command should not be done as that would widen the residual relay attack window. In the latter embodiment, the reader can detect communication errors and in that case restart the proximity check operation (using new RndC and RndR of course).

Each of the random numbers may be a pseudo random number or a truly random number. In contrast to a pseudo random number, a truly random number is a number produced independently of its generating criteria. For cryptographic purposes, numbers based on physical measurements may be considered as random. Pseudo random numbers may be numbers with as little detectable pattern as possible but not truly random. Computer programs may make pseudo random numbers because they cannot make truly random numbers. The random number generator may be part of the transponder/reader.

Any one of the random numbers and the key may be any sequence of numeric characters, sequence of letters, or any alphanumeric code.

Embodiments of the invention are related to transponders, in particular smart cards and RFID tags. For the sake of clarity, this description makes reference primarily to smart cards, although for one skilled in the art it is clear that embodiments of the invention equally relate to RFID tags and transponders in general, as well as to devices in general which communicate over a wired or wireless connection.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
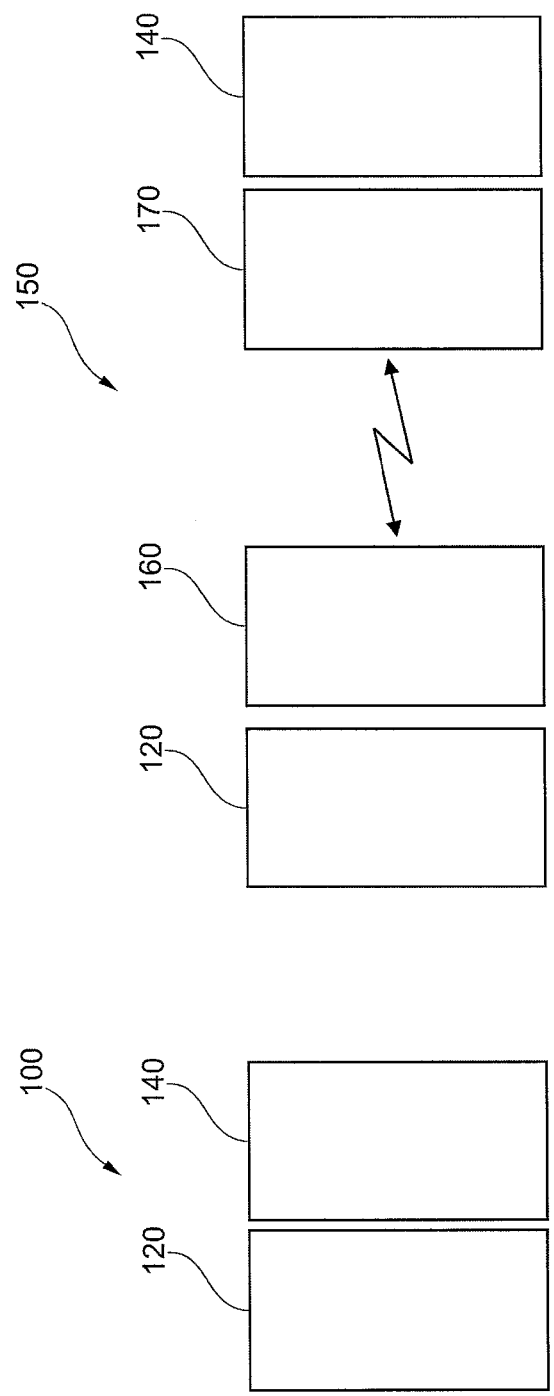
FIG. 1 shows the principles of a relay attack.

The illustration in the drawing is schematically. In different drawings, similar or identical elements are provided with the same reference signs.

Exemplary embodiments of the invention allow to prevent relay attacks of transponder reader systems.

In the following, referring to FIG. 1, it will be explained what a relay attack is.

For this purpose, a transaction is considered using a secure element that is at a distance rather than in close proximity as is intended for these transactions.

FIG. 1 shows a first scenario 100 indicating a normal operation in which a transponder 120 and a genuine reader 140 are in close proximity. The transponder 120 may for example be a smart card or an NFC (Near Field Communication) phone.

FIG. 1 shows a second scenario 150 indicating the presence of a relay attack. In addition to the transponder 120 and the reader 140, a first communication device of an intruder 160 and a second communication device of an intruder 170 are introduced in a communication path of the transponder 120 and the reader 140. Although the presence of the additional communication devices 160, 170 has the consequence that the communication time between transponder 120 and reader 140 is increased, it may conventionally happen that the communication devices 160, 170 may operate the transponder or reader 120, 140 in an undesired manner.

The relay attack may work even when these devices 160, 170 do not know any key. The relay attack works especially well if a transaction can be made without a user action being required (like access to a mass transit). For example, in a full bus or metro it may happen that an attacker may easily find somebody having a transponder that will respond to an intrusion device 160, 170 acting as a reader 140. It is possible to communicate via a mobile phone 160 or 170 to someone else holding his phone at an entry station of the metro. Such a person may get access, and the person in the bus pays. Such relay attacks are applicable for instance to mass transit, but also to key less entry systems in cars.

However, the above system description is only one example where embodiments of the inventions can be used to prevent successful relay attacks. As alternatives to a scenario of an intruder trying to do a relay attack, it is also possible to apply exemplary embodiments of the invention to a legitimate user who, in another system, tries to use a service remotely while the service is intended to be used only in proximity. For example, DRM protected content which is only to be consumed at a certain location or prisoners on parole who need to stay at home. Therefore, exemplary embodiments of the invention may be applied in very different technical scenarios.

A gist of an exemplary embodiment of the invention is to measure the response time of a transponder. When a relay attack is done this will take some time. When the reader detects that the time is longer than normal (outside tolerances), it may conclude a relay attack has been mounted. The transponder can do the same.

However, such a scenario may raise the problem that there is a window of time in which a response of a non-attacked system can come. If this window is large, to accommodate for a large variation in system behaviour (within one system or between systems), then a fast system leaves time to mount an attack. A solution according to an exemplary embodiment of the invention is to make the time window smaller than the amount of time that the fastest relay attack would add. Thus, the relay attack window should be made as small as possible.

Figure 2:
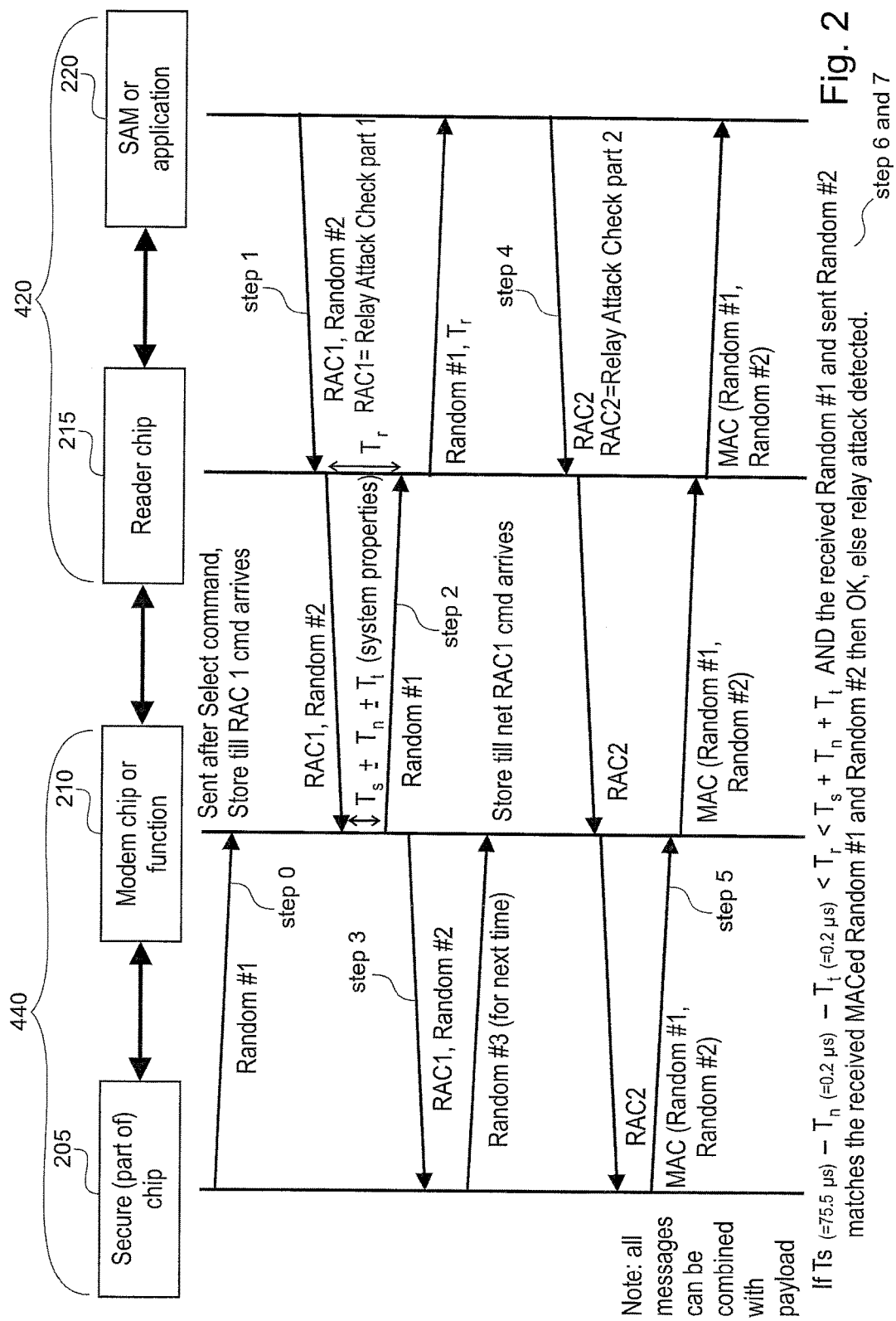
FIG. 2 shows a message flow between a reader and a transponder according to an exemplary embodiment of the invention.

FIG. 2 shows a communication system in which an exemplary embodiment of the invention is implemented. Also referring to FIG. 4, a reader is denoted with reference numeral 420 and a transponder is denoted with reference numeral 440. FIG. 2 further distinguishes between a secure part 205 of the transponder 440 and a modem chip or function 210 of the transponder 440. The reader 420 can be considered as a combination of a reader chip portion 215 and a specific application 220. Along the horizontal direction of FIG. 2, events in the communication system formed by the transponder 440 and the reader 420 are shown. Along the vertical direction of FIG. 2, the time is plotted.

FIG. 2 shows how an embodiment of the invention works in detail.

In a step 0, the reader 420 may, after an anti-collision procedure which is known per se, select one of the transponders in its radio range for further communication. In the transponder 440, a first random number RANDOM #1 is stored in the write buffer to have it ready when the command for the first part of the relay attach check RAC1 arrives.

In a step 1, the application 220 (for instance situated on a microcontroller which is connected to the reader chip 215) sends the command for the first part of the relay attach check RAC1 and a second random number RANDOM #2 to the reader chip 215. The reader chip 215 sends the data to the chip 210 of the transponder 440 without further processing.

In a step 2, the card 440 immediately sends a first random number RANDOM #1 back to the reader 420, which first random number RANDOM #1 has been stored in the card chip in step 0.

In a step 3, the second random number RANDOM #2 is sent to the crypto processor 205 of the transponder 440 which takes this number as a base for generating a third random number RANDOM #3. This third random number RANDOM #3 is then stored for the next request of a reader 420 (the first random number RANDOM #1 is overwritten then).

In a step 4, the application 220 sends the command for the second part of the relay attack check RAC2. This command is transparently forwarded to the crypto processor 205 of the transponder 440.

In a step 5, the crypto processor 205 encrypts the first random number RANDOM #1 and the second random number RANDOM #2 and sends the result MAC(RANDOM #1, RANDOM #2) back to the reader 420.

In a step 6, the application 220 decrypts the received data with the same key which was used by the transponder 440 or encrypts the first random number RANDOM #1 and the second random number RANDOM #2 again with the same key. It should be mentioned that embodiments of the invention are not limited to symmetric key encryption. A MAC can also be done using a public key infrastructure or the like. Then the application 220 checks whether the second random number RANDOM #2 which was sent before and the first random number RANDOM #1 which was received before coincide.

In a step 7, a check is performed whether the first random number RANDOM #1 was received within a dedicated time window and whether the transponder 440 was validly authenticated. If both conditions are true, then the connection between reader 420 and transponder 440 is not corrupted because a) the first random number RANDOM #1 was received within a valid time frame and b) the first random number RANDOM #1 definitely comes from a valid transponder 440.

Because no complicated calculations are needed, step 2 immediately follows step 1. Moreover, the response time is not subjected to significant jitters which could occur if there were a comprehensive encryption procedure. Thus, the valid time window can be made very small. The time consuming authentication procedure can then run "without excitement". Accordingly, measurement of the response time and the authentication procedure are completely decoupled.

In the following, some further considerations will be explained:

An embodiment of the invention is based on a challenge-response protocol, however there is no time needed to calculate the response based on the challenge.

The timing can be exactly determined based on the message RAC1 sent and the random number received.

There are only components with low jitter in the chain. Therefore, there may be a very small residual relay attack window.

To detect forging of messages, the MACed Random #1 and Random #2 are sent. The response is checked by the SAM or application 220

An intruder cannot calculate the MAC.

The RAC2 command is superfluous in principle. The MACed Random #1 and Random #2 can be sent without request as well.

The protocol allows the relay attack check to be carried out multiple times in a session, hence the random #3. If recheck is not needed then it can be left out. But for other applications, for instance where the legitimate owner of the device needs to stay in proximity while using the service, a periodic recheck may be performed.

A non forgeable clock is a valid assumption for, for instance, a mobile phone and a reader. However, for a contactless card or when in, for instance, a mobile phone no accurate clock is available, for example because it also needs to function when the battery is down, this may be an issue. In those cases the card may synchronize to the reader clock and the reader can be a relayed reader which is tampered with to run faster.

If the intruder could let the card run at for instance double speed, the card may send the response after what it thinks is ca. 80 µs, but in reality is 40 µs. Relay attack window would become ca. 80 µs–40 µs=40 µs. A solution for such a scenario is to put a frequency sensor in the card, that switches off the card if the card is operated out of frequency range.

Figure 3:
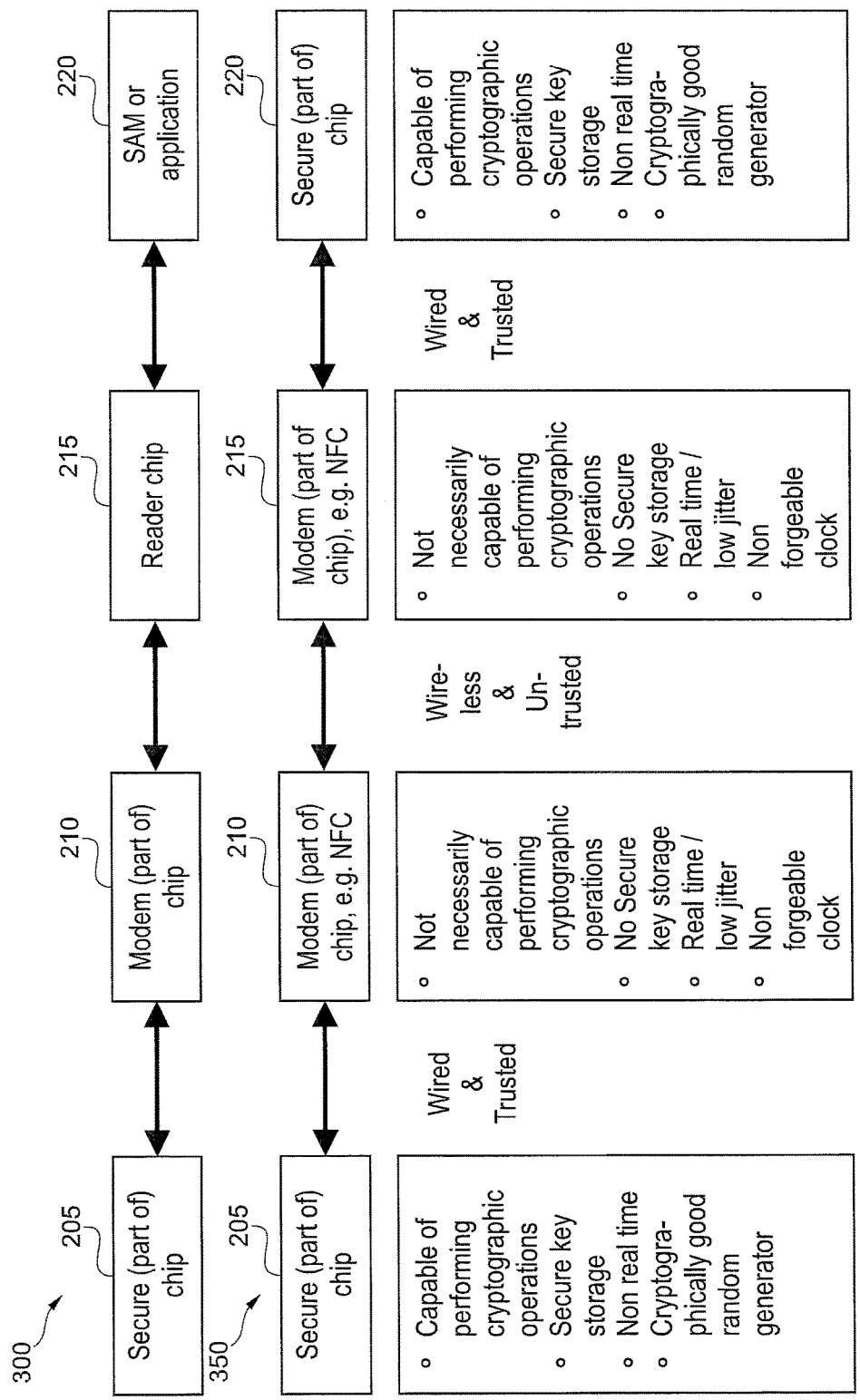
FIG. 3 shows in which examplary fields embodiments of the invention can be used.

FIG. 3 illustrates two different examples of a communication system.

In a first example denoted with reference numeral 300, a card or mobile phone interacts with for instance a mass transit infrastructure.

In a second scenario which is denoted with reference numeral 350, a card or mobile phone interacts with a mobile phone.

The properties of such systems in a classification as wired and trusted, wireless and untrusted, and wired and trusted can be seen in FIG. 3.

In the following, referring to FIG. 4, a communication system 400 according to an exemplary embodiment of the invention will be explained.

The communication system 400 is similar to the scenario shown in FIG. 2 and comprises the reader 420 and the transponder 400.

The reader 420 comprises a processor 422 (such as a microprocessor or a central processing unit) which is communicatively coupled with an emitter antenna 424 and a receiver antenna 426. The emitter antenna 424 is capable of transmitting a communication message 428 to the transponder 440. The receiver antenna 426 is capable of receiving a communication message 430 from the transponder 440. Although the transmission antenna 424 and the receiver antenna 426 are illustrated as two different antennas in FIG. 4, alternative embodiments may also use a single common shared transceiver antenna.

The antennas 424, 426 are electrically coupled with the processor 422 so that data may be sent from the processor 422 to the transmission antenna 424 for transmission as a communication message 428. A communication message 430 received by the receiver antenna 426 may also be analyzed and processed by the processor 422.

A storage unit 432 such as a semiconductor memory is coupled with the processor 422 so as to allow to store data accessible for the processor 422. Furthermore, an input/output unit 434 is shown which allows a user to operate the reader device 420. The input/output unit 434 may comprise input elements such as buttons, a keypad, a joystick or the like. Via such input elements, a user may input commands to the reader device 420. Furthermore, the input/output unit 434 may comprise a display unit such as a liquid crystal display allowing to display results of the reading procedure of the reader device 420 visible for a user.

Figure 4:
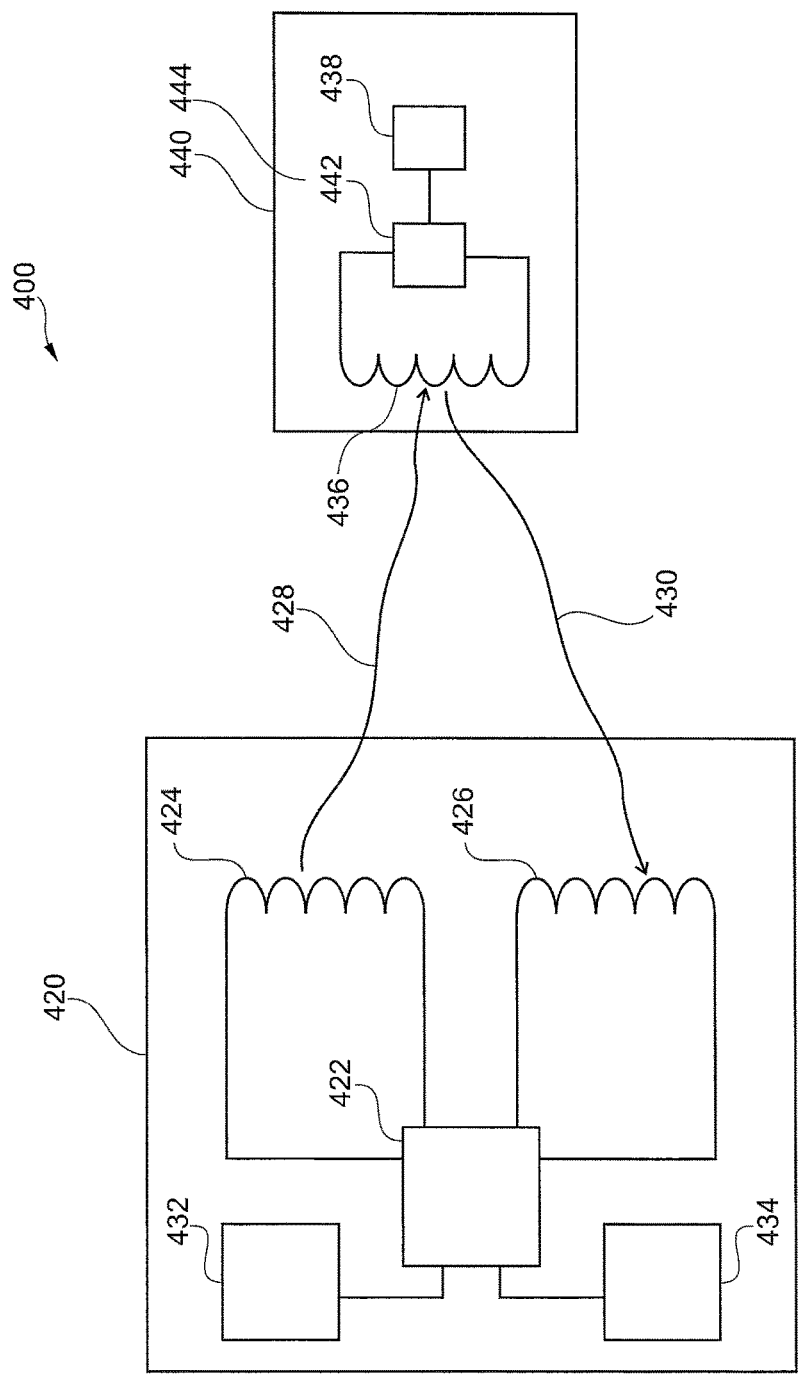
FIG. 4 shows a communication system according to an exemplary embodiment of the invention.

As can be further taken from FIG. 4, the transponder 440 comprises a transmission and receiver antenna 436, a processor 442 such as a microprocessor and a memory 438. In an embodiment, the memory 438 and the processor 442 may be monolithically integrated in an integrated circuit (IC) which can be connected to the antenna 436 and attached to a support 444 such as a piece of fabric.

The communication messages 428, 430 can be exchanged in a wireless manner between the entities 420, 440.

For determining a validity of a connection between the reader 420 and the transponder 440 (that is for determining whether or not the connection between the reader 420 and the transponder 440 is valid), the reader 420 may first send a first command (denoted as RAC1 in FIG. 2) together with a second random number (denoted as RANDOM #2 in FIG. 2) to the transponder 440. Upon receipt of this communication message, for instance the communication message 428 of FIG. 4, the transponder 440 may immediately send back a communication message 430 including the first random number (denoted as RANDOM #1 in FIG. 2) in plaintext. Thus, the transponder 440 may answer in an undelayed and unencrypted manner so as to reduce the relay attack window. When the communication message 428 has also included a second random number (denoted as RANDOM #2 in FIG. 2) this number may be stored in the memory 438 and may serve for deriving a new first random number for a succeeding communication session between the transponder 440 and a reader device such as a reader device 420. The processor 422 of the reader device 420 may store the received first random number in the memory 432 for a later use.

Subsequently, it is optionally possible that the reader 420 sends a further second request to the transponder 440 asking the transponder 440 to transmit a further communication message, now in an encrypted manner. However, such a further request is dispensable since it is alternatively also possible that the transponder 440, on its motion, transmits a second communication message to the reader 420. This second communication message may comprise the first random number and the second random number (denoted as RANDOM #1 and RANDOM #2) in an encrypted or MACed manner. Decrypting the received number (including the first and the second random numbers) by the processor 422 may allow to compare the first and the second random number as transmitted from the transponder 440 with the first and second random numbers stored in the memory 432. In case a MAC is used, the processor 422 calculates a MAC over the same message and compares the result with the MAC as it was received.

Only in a scenario in which the response time to the first request is smaller than a predefined threshold value and there is a proper match between the first and the second random numbers transmitted by the transponder 440 with the second response with the corresponding first and second random numbers stored in the memory 432, the communication between the reader 420 and the transponder 440 will be accepted as valid.

One skilled in the art should note that the transponder, the reader and the methods according to exemplary embodiments are not limited to contactless data transmission, but also apply to wired communication.

In an embodiment, a proximity checking is carried out by measuring the round trip time of a challenge-response interaction. If an attacker wants to mount a relay attack, then he will necessarily introduce delays. Depending on how large the delays are, they may be detected. The accuracy of the time measurement and the residual relay attack window that remains is dependent on the implementation of the PCD's (that is the reader's) Contactless Front-End (PCD-CLF), that is the part of the PCD that takes care of the contactless communication, as well as the PD's (that is the transponder's) CLF. Mounting a relay attack by using mobile phones can be countered by this implementation. Although the check can be done with a single command and single response, the described protocol uses at least three command-response pairs. The actual drawing of a random number at the PD side and the cryptographic calculation may take more time than the time within which the response shall be returned. Therefore, those three elements are decoupled into:

1. Let the PD draw a random number and do not send a response before it is done.

2. Answer with the response random number once the challenge random number has arrived. The PCD can split this step into multiple challenge-response pairs.

3. Perform the cryptographic check to make sure that the numbers have not been tampered with.

Figure 5:
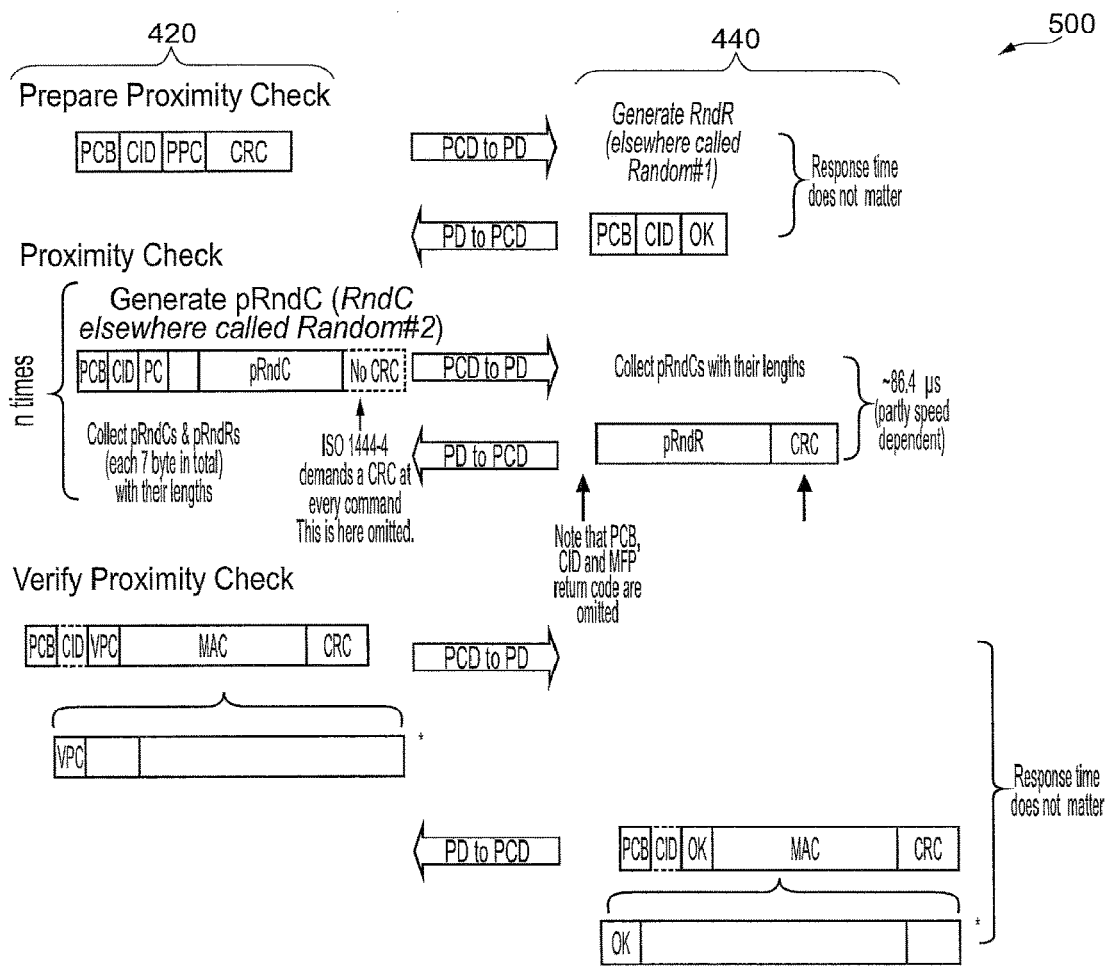
FIG. 5 shows a message flow between a reader and a transponder according to another exemplary embodiment of the invention.

FIG. 5 shows a message flow 500 between a reader 420 and a transponder 440 according to an exemplary embodiment of the invention FIG. 5 gives an overview over a proximity check protocol and gives an example of the messages exchanged during a Proximity Check.

First, the PCD sends a Prepare Proximity Check (PPC) command. This instructs the PD to prepare a 7-byte random number. The PPC command only consists of a command code. It can be answered by the PD, for instance with a success return code. After that, the PCD sends a Proximity Check (PC) command with a part or the full 7-byte random challenge. The PCD may send the whole 7-byte number at once, down to only one byte at a time. In this command the CRC which is normally prescribed by ISO 14443-4 is optionally omitted. Directly after sending the last bit, it is recommended that the PCD starts a timer. Then the PD must respond with a part of its prepared random response of equal length at the exact right time that is the earliest that ISO 14443-4 allows, that is after the minimal Frame Delay Time. This response is sent without a return code. Also all the fields prescribed by ISO 14443-4 are omitted in this response.

The PCD stops the timer directly when it receives the first bit of the PD response. The measured time is the time between sending the random number and receiving the responding random number, that is the minimal Frame Delay Time (FDT) plus the Round-Trip Time (RTT).

This procedure of sending part of the random numbers as a challenge-response pair is repeated by the PCD until the complete 7-bytes are exchanged. In what sizes the random number is split up and, consequently, how many Proximity Check commands are used by the PCD can be chosen freely. In an embodiment, the maximal number of challenge-response pairs can be seven. Both ends collect the received parts of the 7-byte random number and remember the order in which they where received.

It may be recommendable to start the time after sending the last bit and stopping when receiving the first bit, because what is practically possible will be dependent on the PCD-CLF. Different implementations of PCD-CLF allow for different time measurement techniques and therefore to different residual relay attack windows. Following the recommended way of working, plus a fine granularity of time measurement, will lead to the smallest residual relay attack window.

The measured time is compared against a predefined threshold. It is to be chosen by the Contactless Infrastructure Operator depending on the granularity of time measurements possible with the PCD-CLF and an evaluation of the residual risks. A PCD can check the measured time after each Proximity Check command (or use a timer that timeouts when exceeding the threshold value), or it can remember the maximal time measured and do the check only at the end. If the threshold value is exceeded, the Proximity Check protocol fails.

Once the complete n-byte (for instance 7-byte) random challenge was processed with the Proximity Check commands, the PCD sends a Verify Proximity Check (VPC) command. This command contains a MAC over the complete 7-byte random numbers and some information about the speed at which the PD and PCD operate (stored in the PPSE byte), so that an intruder cannot operate the card at a different (higher) speed that is allowed by the ISO standard and gain time to mount an attack (other checks for speed are possible as well). The random number ordering for the MAC input reflects the same split as during the sending of the Proximity Check commands. The PD should verify the incoming MAC. If the MAC verification fails, the PD can go to a state where further operation is not accepted (anymore).

According to an exemplary embodiment of the invention, the entire functionality of the reader and the transponder may be reversed, so the protocol flow is in the other direction. This is an equivalent solution to the explicitly disclosed systems and is also covered by the scope of the claims.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. An apparatus including a reader for determining the validity of a connection to a transponder, the reader comprising:
   at least one antenna configured and arranged to communicate messages to and from the transponder;
   a processor circuit configured and arranged to
      transmit a first command via the at least one antenna;
      receive a first message including first authentication data, via the at least one antenna, from the transponder and in response to the first command,
      transmit a verify proximity check message that includes information about the speed at which the transponder is allowed to operate;
      receive a second message including an encrypted version of both the second authentication data and the first authentication data,
      determine whether the first and second authentication data in the second message sent by the transponder is valid,
      determine whether the first message sent by the transponder was received within a dedicated time window that is based on a frame time delay that is responsive to the speed of the transponder, and
      authenticate the transponder in response to the first and second authentication data received in the second messages being valid and the first message sent by the transponder being received within the dedicated time window; and
   a storage unit circuit configured and arranged to store data accessible for the processor circuit.

2. The apparatus of claim 1, wherein the processor circuit is further configured and arranged to qualify the connection to the transponder as valid only upon determining that both the time interval is within a predetermined time window and that there is coincidence between the authentication data.

3. The apparatus of claim 1, wherein the circuit is further configured and arranged to exchange data for authentication and/or to exchange data for a proximity check with the transponder split into a plurality of communication messages.

4. The apparatus of claim 1, wherein the circuit is further configured and arranged to receive a communication message comprising a Cyclic Redundancy Check from the transponder calculated over the message sent to the transponder and the message received from the transponder and to assume non-validity of exchanged messages with the transponder upon detecting a communication error in the communication message comprising the Cyclic Redundancy Check.

5. The apparatus of claim 1, further including a timer configured and arranged with the processor circuit to begin timing when the first command is sent by the reader, wherein the dedicated time window is a time window beginning when the timer begins timing, and wherein the processor is configured and arranged to determine whether the first authentication data sent by the transponder was received within the dedicated time window based upon a value of the timer when the first authentication data is received.

6. The apparatus of claim 1, wherein the processor circuit is configured and arranged to authenticate the transponder by:
determining that a time window elapsed between sending the first command to the transponder and receiving the first authentication data from the transponder at the reader is within the dedicated time window.

7. A reader is configured for determining the validity of a connection to a transponder, the reader comprising:
at least one antenna configured and arranged to communicate messages to and from the transponder;
a circuit configured and arranged to authenticate the transponder by
measuring a response time based on a time interval between sending data including a first command together with a second random number to the transponder and receiving a first message including a first random number from the transponder in response to the first command,
preventing the transponder from being tampered with to operate faster by communicating the speed that the transponder is allowed to operate;
authenticating the transponder based on:
an evaluation of whether the first message was received within a timing window that is based upon an upper bound for a distance between the reader and transponder and upon the speed that the transponder is allowed to operate; and
an evaluation whether an encryption of the second random number and an encryption of the first random number, received from the transponder in a second message after having received the first random number in the first message for measuring the response time, coincides with the first random number received in the first message for measuring the response time and with the second random number; and
a data storage circuit configured and arranged to store data accessible for the circuit.

8. The reader according to claim 7, wherein the circuit is further configured and arranged to send the first command free from a Cyclic Redundancy Check.

9. The reader according to claim 7, wherein the circuit is further configured and arranged to receive a communication message comprising a Cyclic Redundancy Check from the transponder which Cyclic Redundancy Check is generated by the transponder based on a message received from the reader concatenated with the first random number and the second random number.

10. A method for a reader of determining the validity of a connection to a transponder, the method comprising:
sending a first command together with a second random number to the transponder,
receiving a first message including a first random number from the transponder,
receiving a second message including an encryption of the first random number and of the second random number from the transponder,
decrypting the encrypted first and second random number with a key which was used by the transponder, or encrypting the first random number and the second random number with the key,
checking whether the first random number received in the first message coincides with the encryption of the first random number received in the second message, and
checking whether the second random number sent to the transponder coincides with the encryption of the second random number received in the second message,
checking whether the first random number in the first message was received within a predetermined time window that is based upon an upper bound for a distance between the reader and frame time delay that is subject to tampering through changing a speed at which the transponder operates,
transmitting a verify proximity check message that includes information about a speed at which the transponder is allowed to operate, and
qualifying the connection to the transponder as valid if the result of both checking steps is true.

11. The method according to claim 10, further comprising
receiving the first random number from the transponder in response to the first command,
sending a second command to the transponder after sending the first command,
receiving the encryption of the first random number from the transponder in response to the second command.

12. A non-transitory computer-readable medium, in which a computer program is stored, which computer program, when being executed by a processor, is adapted to carry out or control a method according to claim 10.

13. A method for validating a connection between a transponder and a reader by compliance with a communications protocol used by the transponder and the reader, the communications protocol requiring coincidence in terms of authentication data and of timing information in communications between the transponder and the reader, the method comprising, at the transponder:
receiving a first command in a first message from the reader,
providing distance validation for the connection by sending a second message including a first random number to the reader,
after receiving the first command in the first message, receiving a second random number in a third message from the reader,
wherein after the step of receiving the second random number in the third message, information indicative of a processor speed at which the transponder is allowed to operate is received,
providing authentication validation of the connection, in accordance with the communications protocol, by
sending data indicative of a processor speed, as previously received, at which the transponder operates to the reader within a dedicated time interval that is based on a frame time delay which is responsive to the speed of the transponder and which corresponds to the timing information, and
sending an encryption based on the first random number and the second random number to the reader, and
wherein the communications protocol is used to protect from tampering in communications of the transponder and the reader by indicating a condition for whether the transponder should be disabled, the condition being in response to the time interval being within a predetermined time window and there being coincidence of the authentication data.

14. A non-transitory computer program element in the form of a computer readable medium, the program element, when being executed by a computer including processor circuitry, is adapted to carry out or control a method according to claim 13.

\* \* \* \* \*